(12) United States Patent
Takahashi

(10) Patent No.: US 6,193,041 B1
(45) Date of Patent: Feb. 27, 2001

(54) ELECTROMAGNETIC CLUTCH IN WHICH IMPROVEMENT IS MADE ABOUT RADIATION OF HEAT THEREFROM

(75) Inventor: Takeo Takahashi, Gunma (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 09/345,801

(22) Filed: Jul. 2, 1999

(30) Foreign Application Priority Data

Jul. 3, 1998 (JP) .................................................. 10-188442

(51) Int. Cl.[7] ........................ F16D 27/112; F16D 27/14; F04B 49/00; F01C 21/06; F04C 29/04
(52) U.S. Cl. .................. 192/84.961; 192/113.23; 417/223; 418/69
(58) Field of Search .................... 192/113.22, 113.23, 192/84.961, 84.951; 417/223; 418/69

(56) References Cited

U.S. PATENT DOCUMENTS

| | | | |
|---|---|---|---|
| 880,266 | * 2/1908 | Ast ............................. | 192/113.23 X |
| 1,746,365 | * 2/1930 | Schunemann ............... | 192/113.23 X |
| 2,944,647 | * 7/1960 | Twyman ...................... | 192/113.23 X |
| 3,036,680 | * 5/1962 | Jaeschke ..................... | 192/113.23 X |
| 3,254,746 | * 6/1966 | Myers ......................... | 192/113.23 X |
| 3,777,864 | * 12/1973 | Marti .......................... | 192/113.23 X |
| 3,945,476 | * 3/1976 | De Jong ...................... | 192/113.23 X |
| 4,286,694 | * 9/1981 | Wiseman et al. ........... | 192/113.22 X |
| 4,643,282 | * 2/1987 | Edl .............................. | 192/113.23 X |
| 5,275,269 | * 1/1994 | Steele .......................... | 192/84.961 |
| 5,642,798 | * 7/1997 | Muirhead et al. ........... | 192/84.961 |
| 6,012,563 | * 1/2000 | Aoki et al. .................. | 192/84.951 |

\* cited by examiner

Primary Examiner—Rodney H Bonck
(74) Attorney, Agent, or Firm—Baker Botts L.L.P.

(57) ABSTRACT

In an electromagnetic clutch having a rotating component, groove portions (21a, 21b) are made on a surface of the rotating component to induce air flow during rotation of the rotating component. The air flow enhances radiation of heat from the electromagnetic clutch. It is preferable that the groove portion is formed at each of axial ends of a driving rotor or pulley (12) included as the rotating component in the electromagnetic clutch.

12 Claims, 2 Drawing Sheets

ELECTROMAGNETIC CLUTCH IN WHICH IMPROVEMENT IS MADE ABOUT RADIATION OF HEAT THEREFROM

BACKGROUND OF THE INVENTION

The present invention relates to an electromagnetic clutch and a compressor comprising the same.

An electromagnetic clutch is widely used in various devices such as compressor. A conventional electromagnetic clutch comprises a driving rotator driven to rotate, an armature facing the driving rotator in an axial direction, a driven rotator supporting the armature movably in the axial direction, and a coil for generating electromagnetic force when charged with electricity. By controlling the electricity to the coil, the armature is brought in and out of contact with the driving rotator, thus accomplishing the intermittent transmission of the rotating force. For instance, when the coil is charged with electricity, the armature is pressed against the driving rotator by an electromagnetic force, transmitting by friction the rotating force of the driving rotator to the driven rotator via the armature. When the coil is not charged with electricity, the armature is away from the driving rotator, and the rotating force of the driving rotator is not transmitted to the driven rotator.

The conventional electromagnetic clutch has a problem of heat generation. That is, the coil generates heat while it is charged with electricity. Further, bearings which rotatably support respective driving and driven rotators also generate heat.

However, the conventional electromagnetic clutches have not been provided with almost any provisions for radiating such heat. In other words, they were simply left to effect a self-cooling. Accordingly, there was a possibility of short-circuits caused by a temperature rise at the coil.

SUMMARY OF THE INVENTION

It is therefore an object of the present invention to provide an electromagnetic clutch in which improvement is made about radiation of heat therefrom.

It is another object of the present invention to provide a compressor which comprises the electromagnetic clutch.

Other objects of the present invention will become clear as the description proceeds.

An electromagnetic clutch to which the present invention is applicable comprises a rotating component. In the electromagnetic clutch, the rotating component has a groove portion which induces air flow during rotation of the rotating component. The air flow enhances radiation of heat from the electromagnetic clutch.

A compressor to which the present invention is applicable comprises the electromagnetic clutch described above and a compression mechanism driven through the electromagnetic clutch to compress gaseous fluid.

DESCRIPTION OF THE PREFERRED EMBODIMENT

Figure 1:
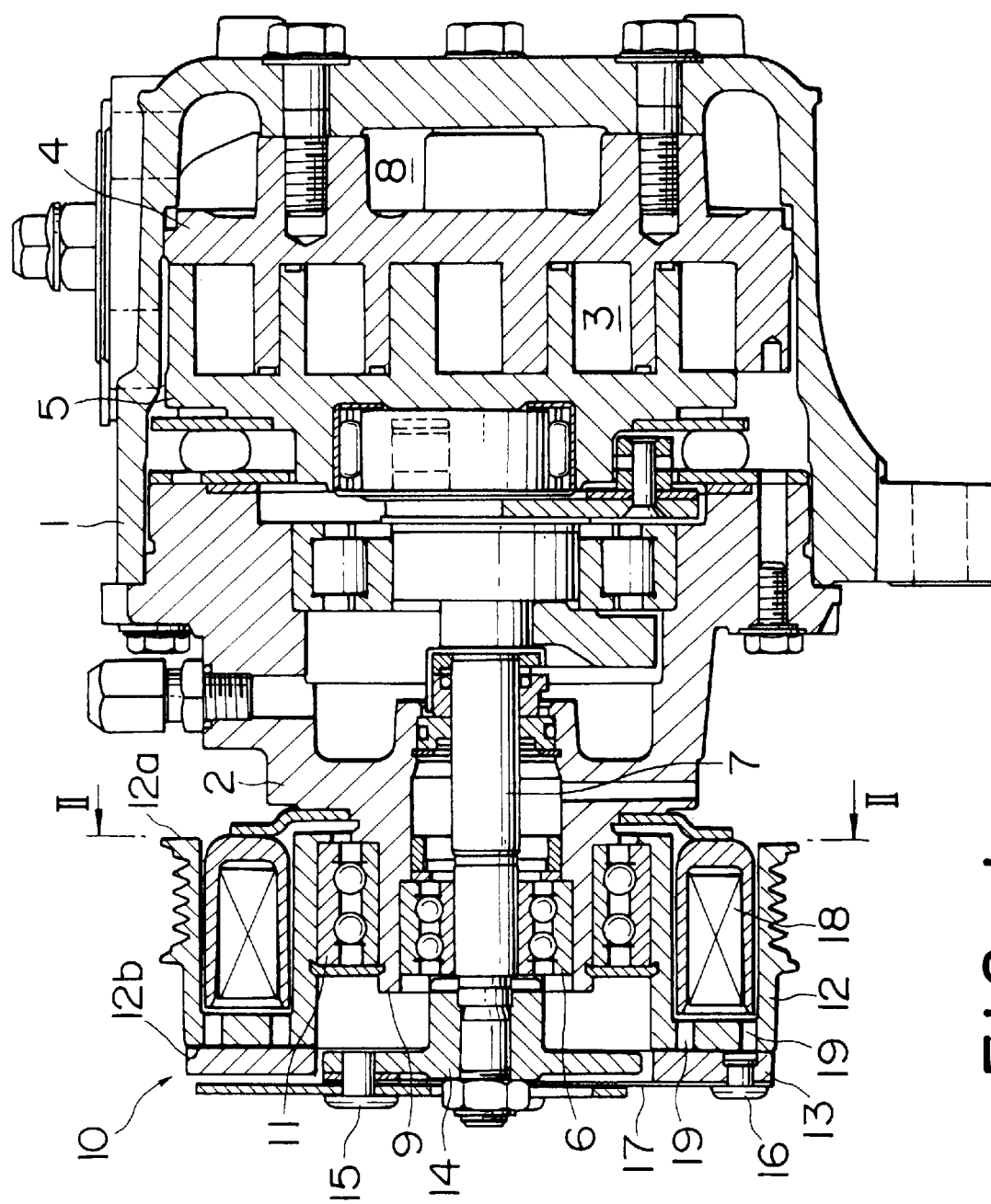
FIG. 1 is a sectional view of a scroll type compressor comprising an electromagnetic clutch according to an embodiment of the present invention.

With reference to FIG. 1, description will be made as regards a scroll type compressor comprising an electromagnetic clutch according to an embodiment of the present invention.

The scroll type compressor is for bringing about a refrigerant flow in a refrigerating circuit of a car air conditioning apparatus and comprises a casing 1 with its one end open and a front end plate 2 which closes the opening of the casing 1. Arranged within the casing 1 are a fixed scroll 4 and a movable or orbiting scroll 5 interfitting each other to define compression chambers 3 between them. The fixed scroll 4 is fixed to the casing 1. The orbiting scroll 5 revolves through an orbit without rotation, by rotation of a driving shaft 7 which is rotatably supported on the front end plate 2 via radial bearing 6. In cooperation with the fixed scroll 4, the orbiting scroll 5 causes the compression chambers 3 to move towards the center of the fixed scroll 4. As a result, the compression chambers 3 are decreased with their volumes. thus, refrigerant gas taken in the compression chambers 3 from the periphery of the orbiting scroll 5 is compressed in the compression chambers 3 before it is ejected to an ejecting chamber 8. A combination of the fixed and the orbiting scrolls 4 and 5 is referred to a compression mechanism.

An electromagnetic clutch 10 is provided at the front of the scroll type compressor. The front end plate 2 has a cylindrical portion 9 protruding forward. The electromagnetic clutch 10 comprises a pulley 12 serving as a driving rotator which is rotatably mounted on the cylindrical portion 9 of the front end plate 2 via a radial bearing 11, an armature 13 facing the pulley 12 in the axial direction, a boss 14 serving as a driven rotator which is fixed on the driving shaft 7, a plate spring 17 serving as an elastic supporting member for supporting the armature 13 onto the boss 14 by means of rivets 15 and 16 in such a manner that the armature 13 can move in the axial direction, and a coil 18 for generating electromagnetic force to bring the armature 13 in and out of contact with the pulley 12. An automobile engine drives the pulley 12 via a belt in the manner known in the art. A reference numeral 19 designates a plurality of slits for effectively forming a magnetic path or circuit.

When the electricity is charged on the coil 18, the electromagnetic force causes the armature 13 to be pressed against the axial end face of the pulley 12 with elastically bending the plate spring 17. Therefore, the rotating force of the pulley 12 is transmitted to the boss 14 and the driving shaft 7 via the armature 13 by friction between the pulley 12 and the armature 13. When the electricity to the coil 18 is off, the armature 13 is withdrawn from the pulley 12 by reaction force of the plate spring 17, thereby preventing the transmission of the rotating force of the pulley 12 to the boss 14 and the driving shaft 7. In this way, the electromagnetic clutch 10 accomplishes the intermittent transmission of the power to the above-described compression mechanism.

Meanwhile, the coil 18 generates heat while charged with electricity. The bearing 11 also generates heat while the pulley 12 is rotating.

Figure 2:
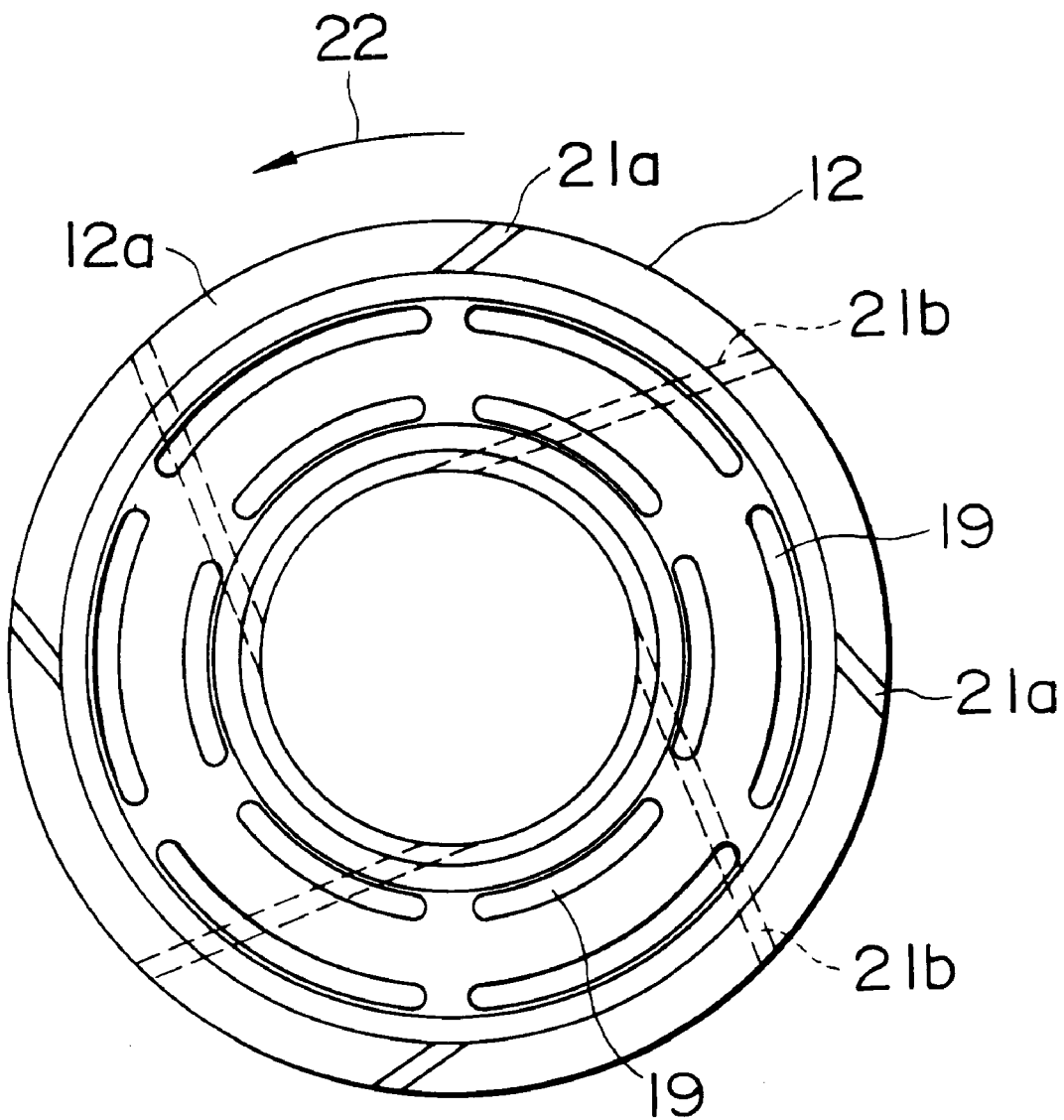
FIG. 2 shows a sectional view of a pulley included in the electromagnetic clutch of FIG. 1 as taken along the line II—II in FIG. 1.

With reference to FIG. 2 showing the pulley 12 as viewed from the compressor side, the description will be made as regards a countermeasure for such heat.

The pulley 12 is provided with a plurality of groove portions 21a and 21b which are formed in both axial end faces 12a and 12b thereof, respectively. Each of the groove portions 21a and 21b extends in a direction intersecting both radial and tangential directions. In FIG. 2, the groove portions 21a shown by solid lines are formed on one end face 12a, and the groove portions 21b shown by broken lines are formed on the other end face 12b. The arrow 22 indicates the rotating direction of the pulley 12.

As can be seen from FIG. 2, the groove portions 21a, 21b are formed in such a manner as to induce air flow outwards, thereby enhancing the heat radiation. Since the heat radiation capacity is increased, the problem of heat accumulation at the coil 18 and radial bearing 11 is solved. Namely, the coil 18 and the radial bearing 11 are forcibly cooled by air flow, and the temperature rise at these locations are restrained.

While the present invention has thus far been described in connection with a single embodiment thereof, it will readily be possible for those skilled in the art to put this invention into practice in various other manners. For example, it is possible to modify the number of the groove portions. The electromagnetic clutch can be used in another type compressor such as a swash plate type compressor.

What is claimed is:

1. An electromagnetic clutch comprising a rotating component, wherein said rotating component has a groove portion which induces air flow during rotation of said rotating component, said air flow enhancing radiation of heat from said electromagnetic clutch, wherein said groove portion is disposed in a radial and angular direction, and formed to direct said air flow radially and outwardly in accordance with the rotation of said rotating component, and wherein said rotating component comprising:

a driving rotator driven to rotate and having axial ends opposite to each other in an axial direction;

an armature facing one of said axial ends of the driving rotator in said axial direction; and a driven rotator supporting said armature movably in said axial direction, said groove portion being formed on at least one of said axial ends of the driving rotator.

2. An electromagnetic clutch as claimed in claim 1, further comprising a coil for generating electromagnetic force to bring said armature in and out of contact with one of said plurality of axial ends of the driving rotator.

3. A compressor comprising:

the electromagnetic clutch claimed in claim 2; and a compression mechanism driven through said electromagnetic clutch to compress gaseous fluids.

4. A compressor comprising:

the electromagnetic clutch claimed in claim 1; and a compression mechanism driven through said electromagnetic clutch to compress gaseous fluids.

5. An electromagnetic clutch comprising a rotating component, wherein said rotating component comprising:

a driving rotator driven to rotate and having axial ends opposite to each other in an axial direction;

an armature facing one of said axial ends of the driving rotator; and a driven rotator supporting said armature movably in said axial direction, said driving rotator has a groove portion formed in said one of the axial ends of the driving rotator for inducing air flow between said driving rotator and said armature in accordance with the rotation of said driving rotator when said armature is spaced from said one of the axial ends of the driving rotator, said air flow enhancing radiation of heat from said electromagnetic clutch.

6. An electromagnetic clutch as claimed in claim 5, wherein said groove portion is formed to direct said air flow radially and outwardly in accordance with the rotation of said driving rotator.

7. A compressor comprising:

the electromagnetic clutch claimed in claim 6; and a compression mechanism driven through said electromagnetic clutch to compress gaseous fluids.

8. An electromagnetic clutch as claimed in claim 5, wherein said driving rotator further has an additional groove portion formed in another of said axial ends for inducing air flow during said rotation of the driving rotator, said air flow enhancing said radiation of heat from said electromagnetic clutch.

9. A compressor comprising:

the electromagnetic clutch claimed in claim 8; and a compression mechanism driven through said electromagnetic clutch to compress gaseous fluids.

10. An electromagnetic clutch as claimed in claim 5, further comprising a coil for generating electromagnetic force to bring said armature in and out of contact with said one of the axial ends of the driving rotator.

11. A compressor comprising:

the electromagnetic clutch claimed in claim 10; and a compression mechanism driven through said electromagnetic clutch to compress gaseous fluids.

12. A compressor comprising:

the electromagnetic clutch claimed in claim 5; and a compression mechanism driven through said electromagnetic clutch to compress gaseous fluids.

* * * * *